May 15, 1928. 1,670,096

J. S. BOOTH

TORQUE TUBE STRUCTURE

Filed Sept. 4, 1926

INVENTOR.
James Scripps Booth
BY
Stuart C. Barnes
ATTORNEY.

Patented May 15, 1928.

1,670,096

UNITED STATES PATENT OFFICE.

JAMES SCRIPPS BOOTH, OF DETROIT, MICHIGAN.

TORQUE-TUBE STRUCTURE.

Application filed September 4, 1926. Serial No. 133,580.

This invention relates to automobiles, and it has to do more particularly with a torque tube structure for automobile axles of the underslung driving type.

In order that the frame of an automobile, and the body structure generally may be lowered, the underslung type of worm drive has been proposed. This permits a lowering of the propeller shaft and other associated parts so that sufficient clearance is obtained for the lowering of the frame.

With this type of axle, the portion which encloses the spiral gear and worm is quite close to the ground, so that there is not much road clearance. It is undesirable to further reduce this road clearance because obstructions in the roadway would strike this portion of the rear axle.

It has been proposed to use such rear axles with what is known as the Hotchkiss drive, where the driving power is communicated to the frame of the automobile through the springs. However, the torque tube drive, where a tube encloses the propeller shaft, and through which the driving power is transmitted to the frame of the car, has certain advantages over the Hotchkiss type of drive, and it is preferred by many automobile manufacturers.

Such torque tubes are usually secured to the rear axle housing by means of a member which has an annular flange concentric with the torque tube and which is bolted or otherwise fastened to the housing by relatively small bolts. This member, and particularly the flange, must be of generous proportions so as to have sufficient strength to overcome various strains, twisting actions and jolts to which it is subjected. The use of a torque tube on the underslung worm drive type of axle is objectionable because this member with the flange, is of such a size as to project downwardly below the rear axle housing, thus reducing the road clearance and forming a shoulder to catch objects in the road. In some structures this housing clears the road by only about eight inches, and a reduction of this clearance by even an inch or two is seriously objectionable. Moreover, my torque tube flange presents a flat-faced or skid-like surface which can slide over any obstruction that may be struck.

According to this invention, the torque tube is constructed so that the clearance between the housing and the ground is not reduced, and the structure affords a smooth substantially horizontal surface which has a tendency to ride over obstructions in the road rather than catching against them. The torque tube and the rear axle housing are formed so that the connection between the two has sufficient strength to overcome the strains, etc., to which it is subjected, notwithstanding the fact that the structure does not reduce the road clearance.

Figure 1:
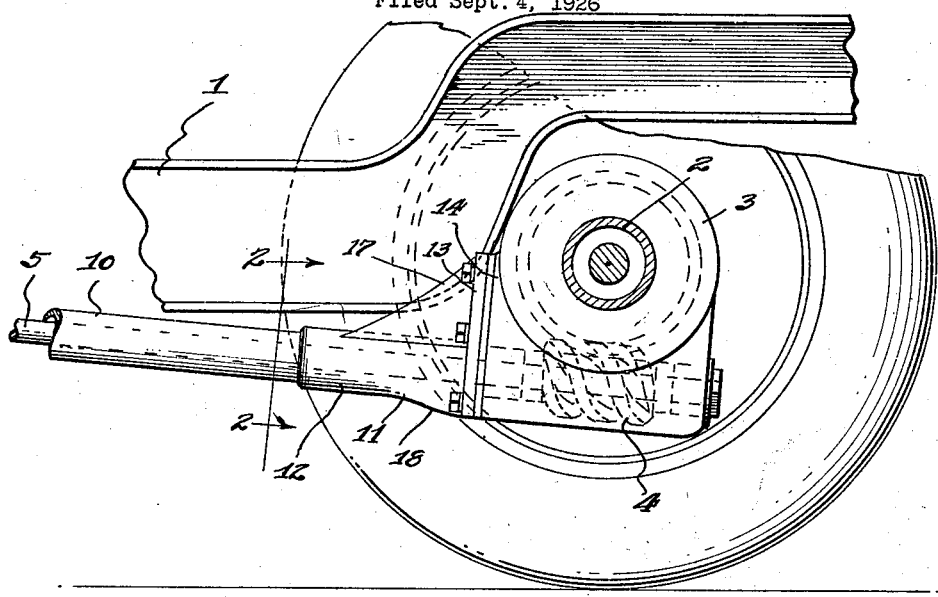
Fig. 1 is a longitudinal section of the rear portion of an automobile showing the arrangement of the torque tube and rear axle.

In the drawings the frame of the automobile is shown at 1, and this frame is supported in the usual manner by springs which are mounted upon the rear axle referenced generally 2. This rear axle is provided with a portion 3, for enclosing a spiral gear and a worm 4. The worm is mounted upon a propeller shaft 5, which is driven by the engine of the automobile. The propeller shaft is enclosed by a torque tube 10, and the torque tube is provided at its end with a member 11 which is adapted to be secured to the portion 3. This member 11 may be secured to the torque tube in any desired manner, as by means of riveting or welding. In the present instance the member 11 includes a tubular part 12, and a flange-like part 13.

Figure 2:
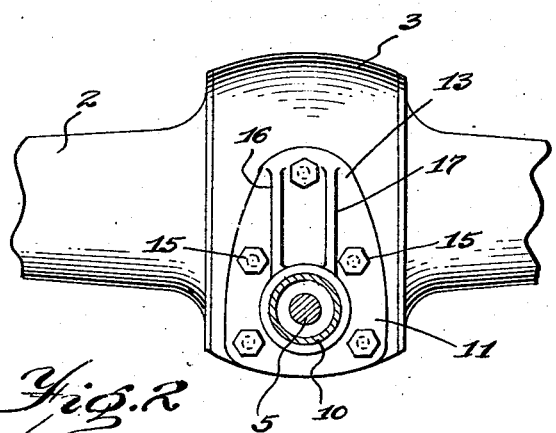
Fig. 2 is a sectional view taken on line 2—2 of Fig. 1.

It will be observed, by reference to Fig. 2, that the member 11 is formed so that it extends upwardly, covering a considerable portion of the housing, and the housing is correspondingly shaped, as shown at 14, so that the member and the housing fit together. By this arrangement, the torque tube can be secured to the housing by means of a plurality of bolts 15. This arrangement affords ample contacting surface between the torque tube and the housing and makes possible the use of bolts in sufficient numbers and size so that the structure is sufficiently strong to overcome the abuse to which it is subjected.

By further reference to Fig. 2, it will be noted that the lowermost portion of the flange member 13 lies substantially flush with the lowermost edge of the housing. Thus the torque tube has a connection with the rear axle which is of ample strength and yet which does not reduce the road clearance. Ordinarily, the flange on the end of the torque tube projects from the torque tube equally in all directions, but according to this invention the torque tube is disposed relatively close to one edge of the flange, and as a result, the propeller shaft 5 does not pass through the central portion of the flange member.

In order to additionally strengthen the structure, the member 11 may be provided with bracing members 16 and 17 which may be in the form of webs extending from the flange portion to the tubular portion 12. These members may be used where considerable strength is desired, although they may be dispensed with and the flanged portion be made sufficiently heavy to give it the needed strength. Moreover, in automobiles of relatively light construction, this additional strengthening structure may not be used.

Since the road clearance in this type of axle is not great, it is desirable that the contour of the torque tube, together with the rear axle, be such as to present a substantially unbroken lowermost surface, so that there will be no part which will abut directly against an obstruction in the roadway. For this purpose the member 11 may be sloped, as at 18, so that there is no break in its contour, and so that it merges in with the lowermost part of the axle. It will be observed that an obstruction which happens to strike at this point will have a tendency to ride under the sloping part and along the smooth undersurface of the housing.

Thus it will be seen that the present invention provides a torque tube drive structure for the underslung type of driving axle, which is of sufficient strength for the purpose, but which does not further reduce the road clearance, and which at the same time gives the structure a smooth, substantially horizontal undersurface which aids in the passing of obstructions in the road, and by which, undesirable projections on and adjacent the axle structure are eliminated. The shape of the flange portion 13, and the number of bolts or other fastening devices, may be changed to meet particular requirements without departing from the spirit of this invention.

What I claim is:

1. In an automobile, the combination of a driving axle having a housing, a gear in the housing, a propeller shaft having a connection with the gear below the center of the axle, a torque tube enclosing the propeller shaft, and means on the end of the torque tube for connecting the torque tube with the housing, said means including a flange portion which is secured to the housing, the greater part of said portion lying above the torque tube, and the lowermost part of the portion terminating substantially at the lower edge of the housing, the housing being shaped to fit the flange portion.

2. In an automobile, the combination of a driving axle having a housing, a gear in the housing a propeller shaft having a connection with the gear below the center of the axle, a torque tube enclosing the propeller shaft, means on the end of the torque tube for connecting the torque tube with the housing, said means including a flange-like portion which is secured to the housing, the greater part of said portion lying on the upper side of the torque tube, and the lowermost portion terminating substantially at the lower edge of the housing, the housing being shaped to fit the flange like portion, and means for reinforcing said flange-like portion.

3. In an automobile, the combination of a driving axle having a housing, a gear in the housing, a propeller shaft having a connection with the gear below the center of the axle, a torque tube enclosing the propeller shaft, and means on the torque tube for connection with the housing, said means including a flange-like portion which is secured to the housing, the greater part of said portion lying on the upper side of the torque tube, and the lowermost part of the portion terminating substantially at the lower edge of the housing, and the housing being correspondingly shaped to fit the flange like portion, the lower contour of said torque tube connecting means being such as to merge in with the lowermost portion of the housing so as to present a smooth, substantially unobstructed surface.

4. In an automobile, the combination of an underslung worm and worm gear driving axle, including a housing, a propeller shaft fastened to the worm, and a torque tube enclosing the propeller shaft, said torque tube being connected to the housing of the axle by a member, a greater portion of which lies on the upper side of the propeller shaft, whereby said member is of sufficient size to overcome strains to which a torque tube is subjected without projecting below the lowermost edge of the housing.

5. In an automobile, the combination of an underslung worm and worm gear driving axle, including a housing, a propeller shaft connected with the worm, a torque tube enclosing the propeller shaft, said torque tube being connected to the axle housing by a member having a tubular part which is connected to the torque tube, and said member having a flange-like portion, the greater portion of which lies in the upper side of the said tubular part, said flange-like portion being connected to the axle housing, and means connecting the upwardly extending part of the flange-like portion with the said tubular part for reinforcing the said member.

6. In an automobile, the combination of an axle housing, an underslung axle driving connection and axle shafts, a propeller shaft connected with the axle driving connection, a torque tube enclosing the propeller shaft, said torque tube being connected to the axle housing by a member having a tubular part which is connected to the torque tube, and said member having a flange-like portion, the greater portion of which lies above the said tubular part, said flange-like portion being connected to the axle housing, and web members connecting the upwardly extending portion of the flange with said tubular part for reinforcing the said member.

7. In an automobile, the combination of an axle housing, an underslung axle connection and axle shafts, a propeller shaft connected with the axle connection, a torque tube enclosing the propeller shaft, said torque tube being connected to the housing by a member having a tubular part which is connected to the torque tube, and said member having a flange-like portion, the greater portion of which lies in the upper side of the said tubular part, said flange-like portion being connected to the axle housing, the lower contour of said member being such as to merge in with the lowermost portion of the axle housing so as to present a smooth substantially unobstructed surface.

In testimony whereof I affix my signature.

JAMES SCRIPPS BOOTH.